United States Patent [19]

Cole, Jr.

[11] Patent Number: 4,650,502
[45] Date of Patent: Mar. 17, 1987

[54] PRESSURIZED GASEOUS AQUEOUS AMMONIA SEPARATION SYSTEM

[75] Inventor: T. Phillip Cole, Jr., Monroeville, Pa.

[73] Assignee: United States Steel Corporation, Pittsburgh, Pa.

[21] Appl. No.: 466,263

[22] Filed: Feb. 14, 1983

Related U.S. Application Data

[63] Continuation of Ser. No. 6,828, Jan. 26, 1979, abandoned.

[51] Int. Cl.⁴ .............................................. B01D 47/05
[52] U.S. Cl. .......................................... 55/70; 55/80
[58] Field of Search .................... 55/29, 30, 49, 70, 80

[56] References Cited

U.S. PATENT DOCUMENTS

| 2,500,291 | 3/1950 | Liebel et al. | 55/70 |
|---|---|---|---|
| 2,808,125 | 10/1957 | Buck et al. | 55/70 |
| 3,186,795 | 6/1965 | Fields et al. | 55/70 X |
| 3,702,525 | 11/1972 | Simonet et al. | 55/70 X |
| 3,985,863 | 10/1976 | Rice et al. | 55/70 X |
| 4,002,565 | 1/1977 | Farrell et al. | 55/70 X |
| 4,011,066 | 3/1977 | Bratzlev et al. | 55/70 X |
| 4,119,412 | 10/1978 | Advani | 55/70 |
| 4,120,667 | 10/1978 | Gettert et al. | 55/70 X |

FOREIGN PATENT DOCUMENTS 53-64671  6/1978  Japan .

Primary Examiner—Charles Hart
Attorney, Agent, or Firm—William L. Krayer

[57] ABSTRACT

Systems and methods are provided for separating a first pressurized gaseous aqueous ammonia stream into a second gaseous ammonia stream having a higher ammonia concentration than the first stream and a third gaseous aqueous ammonia stream of reduced pressure and lower ammonia concentration than the first stream. Apparatus for accomplishing this comprises (1) heat exchange means for partially condensing the first gaseous stream to produce the second gaseous stream and a liquid aqueous ammonia stream having a lower ammonia concentration than the first stream, (2) means for separating the second gaseous stream from the liquid stream, (3) means for lowering the pressure of the liquid stream, and (4) means for indirectly contacting the liquid stream having a reduced pressure with the first gaseous stream in a heat exchange relationship at the heat exchange means for partially condensing the first gaseous stream to thereby vaporize the liquid stream, at least in part with the heat of condensation from the first gaseous stream. The apparatus may also include means for separately recycling the second and third gaseous streams through the apparatus of this invention to further concentrate the ammonia and to further remove ammonia with respect to these streams. This apparatus is especially energy efficient and very economically provides a concentrated gaseous aqueous ammonia stream which can be further processed for recovery of the ammonia or be incinerated without the addition of further fuel. Gaseous aqueous ammonia streams of low ammonia concentration require additional fuel to be added to accomplish incineration.

11 Claims, 2 Drawing Figures

PRESSURIZED GASEOUS AQUEOUS AMMONIA SEPARATION SYSTEM

This is a continuation of application Ser. No. 6,828, filed Jan. 26, 1979 and now abandoned.

BACKGROUND OF THE INVENTION

1. Field of the Invention

This invention relates to the field of separation of pressurized gases having different boiling points, and more particularly, the separation or partial separation of gaseous ammonia and water vapor from a pressurized gaseous aqueous ammonia stream.

2. Description of the Prior Art

Various processes are in use wherein an aqueous ammonia vapor under pressure is produced, such as the stripper column in a process such as taught in U.S. Pat. Nos. 3,024,090; 3,054,726; 3,186,795; and 3,985,863, each incorporated herein by reference. This vapor is usually either condensed and fed to an ammonia-distillation facility to recover the ammonia or fed to a unit to destroy the ammonia catalytically or by combustion. These methods are generally very expensive due to the large equipment needed. If there are large quantities of ammonia produced, then the costly large equipment for recovery of the ammonia can be justified. However, where the quantities of ammonia are relatively small, it becomes impractical to recover the ammonia. Destruction of the ammonia catalytically is relatively expensive. The aqueous ammonia is often at an ammonia concentration of between about 5 and about 40 percent by volume. At these concentrations, it is not even possible to combust the gaseous stream without adding additional expensive fuel. The combustion equipment required for such incineration tends to be large and expensive.

SUMMARY OF THE INVENTION

Very unique and economical systems and methods have been found wherein the concentration of these pressurized aqueous ammonia vapors can be appreciably enriched in ammonia, thus reducing the need for additional fuel in carrying out combustion and reducing required equipment sizes for such combustion.

An apparatus for separating a first pressurized gaseous aqueous ammonia stream into two gaseous streams, one having a higher ammonia concentration and the other a lower ammonia concentration than the first gaseous stream, comprises:

(1) heat exchange means for partially condensing the first gaseous stream to produce (a) a second gaseous stream having a higher concentration of ammonia than the initial gaseous stream, and (b) a liquid stream having a lower concentration of ammonia than the initial gaseous stream, (2) means for separating the second gaseous stream from the liquid stream, (3) means such as a throttling valve for lowering the pressure of the liquid stream, and (4) means for indirectly contacting the liquid stream having a reduced pressure with the first gaseous stream in a heat exchange relationship to thereby vaporize the liquid stream to form a third gaseous stream. The heat of vaporization becomes the heat of condensation at the heat exchange means.

The ammonia enriched vapors from the vapor-liquid separation means can be passed into another apparatus of this invention for further ammonia enrichment in a "cascade" fashion and the lower pressure vapors from the exchanger can also be "cascade" processed until the final enriched-ammonia vapor stream is of sufficient concentration to achieve economical handling and the lower pressure vapors, containing very little ammonia, can be utilized as low-pressure steam elsewhere in the plant.

DESCRIPTION OF THE DRAWING AND PREFERRED EMBODIMENTS

The means for partially condensing the first gaseous stream is preferably one capable of partially condensing a gaseous aqueous ammonia stream having a pressure between about 150 and 300 psia.

Preferably, the means for lowering the pressure is a throttle valve and is capable of lowering the pressure to between about atmospheric pressure and about 150 psia.

The first gaseous stream preferably contains ammonia in a concentration between about 5 and about 40 percent by volume, and more preferably, between about 10 and about 25 percent by volume.

The apparatus of this invention may additionally comprise means for recovery of the heating value or chemical value of the second and/or third gaseous streams. It may also comprise means for producing a condensate from the second and/or third gaseous streams.

Figure 1:
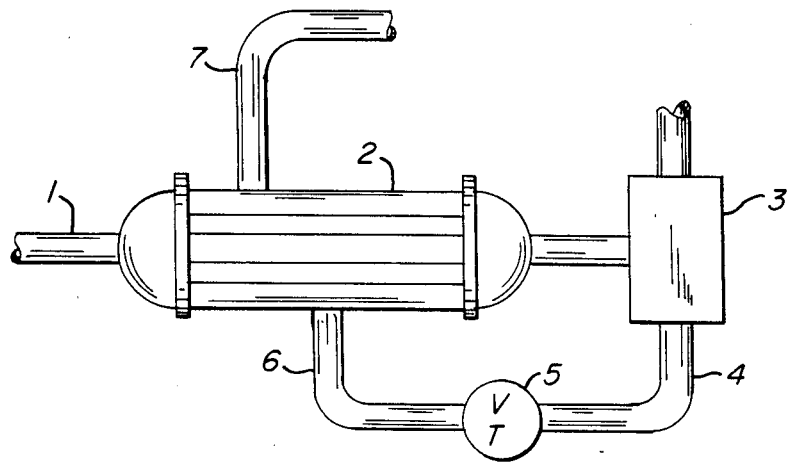
FIG. 1 is a schematic illustration of the systems and methods of this invention.

This invention is illustrated by reference to FIG. 1, wherein a first gaseous stream of aqueous ammonia at 190 psia, 23.17 volume percent ammonia, and 355.1° F. from the top of a PHOSAM ™ ammonia stripper of the type described in the aforementioned patents is fed through conduit 1 to tube side of heat exchanger 2 and partially condensed by cooling to 334.5° F. (about 55% condensed). The gaseous stream is passed into a vapor-liquid separator 3 at the end of the exchanger 2. The second gaseous stream from the separator 3 (about 45% of the feed) contains about 42 percent ammonia at 190 psia pressure. If desired, this second gaseous stream may be "cascaded" to a higher concentration for further processing or may be combusted as is without addition of further fuel. The liquid stream from the separator 3 (55% of the feed) contains about 8 percent ammonia. It is passed by conduit 4 to means for reducing the pressure, such as throttle valve 5 to 25 psia pressure of 8 percent ammonia for further "cascade" treatment or for use as low-pressure steam by passing out conduit 7.

Thus an aqueous ammonia vapor stream under pressure has been split into a more concentrated ammonia vapor containing about 82 percent of the incoming ammonia and a lower pressure vapor containing about 18 percent of the incoming ammonia.

Figure 2:
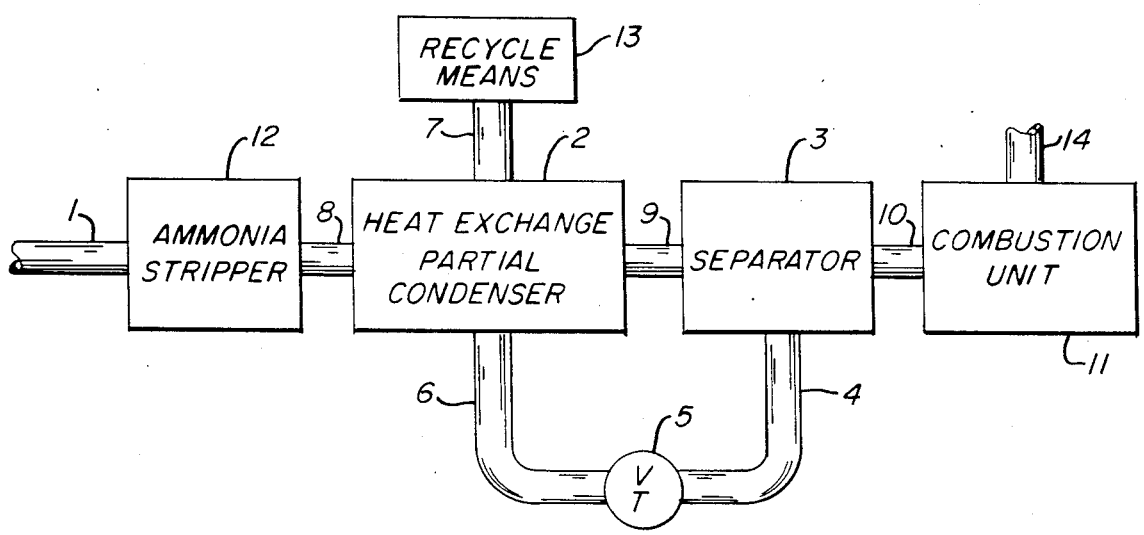
FIG. 2 is a schematic illustration of preferred systems and methods of this invention.

FIG. 2 is a preferred system of this invention wherein a chemical absorbent such as ammonium phosphate containing absorbed ammonia enters through conduit 1 to ammonia stripper 12 where the absorbed ammonia is removed by steam stripping to produce a first pressurized gaseous aqueous ammonia stream. This first stream travels through conduit 8 to heat exchange partial condenser wherein 40 to 70 percent by weight of the gaseous components are condensed to form a second gaseous stream having an increased concentration of ammonia as compared to the first gaseous stream and a liquid stream containing a lower concentration of ammonia. These components are passed by conduit 9 to separator 3 where the gaseous stream is separated from the liquid stream. The second gaseous stream passes through conduit 10 to combustion unit 11 where the gaseous stream is incinerated without the addition of additional fuel. The combustion stream leaves the combustion unit 11 by conduit 14. The liquid stream passes from the separator 3 through conduit 4 to pressure reducing means 5, preferably in the form of a throttle valve. The reduced pressure liquid stream passes through conduit 6 to heat exchange partial condensor where it indirectly is heated by the condensing first gaseous stream to thereby produce a third gaseous stream of reduced pressure which is passed through conduit 7 to recycle means 13 which begins the procedure over either by contacting this third gaseous stream with a chemical absorber and then passing the chemical absorbent with absorbed ammonia to the ammonia stripper 12 or "cascading" by adding this third gaseous stream to a heat exchange partial condenser of a different system of this invention.

I claim:

1. A process for separating a first pressurized gaseous aqueous ammonia stream into two streams, one having a higher ammonia concentration and the other a lower ammonia concentration than the first gaseous stream, comprising
    (1) partially condensing the first gaseous stream to produce (a) a second gaseous stream having a higher concentration of ammonia than the initial gaseous stream, and (b) a liquid stream having a lower concentration of ammonia than the first gaseous stream,
    (2) separating the second gaseous stream from the liquid stream,
    (3) lowering the pressure of the liquid stream, and
    (4) indirectly contacting the liquid stream having a reduced pressure with the first gaseous stream in a heat exchange relationship to thereby vaporize at least a portion of the liquid stream to form a third gaseous stream.

2. Process as in claim 1 additionally comprising the additional step of absorbing the ammonia from the third gaseous stream.

3. Process as in claim 1 wherein the step of partially condensing the first gaseous stream is carried out at a pressure between about 150 and about 300 psia.

4. Process as in claim 1 wherein the step of lowering the pressure is carried out at a pressure of between about atmospheric pressure and about 150 psia.

5. Process as in claim 1 wherein the first gaseous stream contains ammonia in a concentration of between about 5 and about 25 percent by volume.

6. Process as in claim 1 additionally comprising the step of combusting the second gaseous stream.

7. Process as in claim 1 additionally comprising the step of stripping the first gaseous stream from a chemical absorbent to thereby provide a source of the first pressurized gaseous stream.

8. Process as in claim 1 wherein the step of lowering the pressure of the liquid stream is carried out by means of a throttling valve.

9. Process as in claim 1 additionally comprising the step of separately recycling the second gaseous stream through the process of claim 1.

10. Process as in claim 1 additionally comprising the step of recovering the heating value or chemical value of the second or third gaseous streams.

11. Process as in claim 1 additionally comprising the step of producing a condensate from the second or third gaseous streams.

* * * * *